United States Patent
Ruesch et al.

(10) Patent No.: US 9,104,343 B2
(45) Date of Patent: Aug. 11, 2015

(54) GLOBAL SYNCHRONOUS CLOCK CIRCUIT AND METHOD FOR BLADE PROCESSORS

(71) Applicant: Silicon Graphics International Corp., Fremont, CA (US)

(72) Inventors: Rodney A. Ruesch, Eau Claire, WI (US); Eric C. Fromm, Eau Claire, WI (US); Robert W. Cutler, Chippewa Falls, WI (US); Richard G. Finstad, Eau Claire, WI (US); Dale R. Purdy, Apple Valley, MN (US); Brian J. Johnson, Rosemount, MN (US); John F. Steiner, Mendota Heights, MN (US)

(73) Assignee: Silicon Graphics International Corp., Milpitas, CA (US)

( * ) Notice: Subject to any disclaimer, the term of this patent is extended or adjusted under 35 U.S.C. 154(b) by 280 days.

(21) Appl. No.: 13/798,604

(22) Filed: Mar. 13, 2013

(65) Prior Publication Data
US 2014/0281656 A1    Sep. 18, 2014

(51) Int. Cl.
*G06F 1/08* (2006.01)
*H04J 3/06* (2006.01)

(52) U.S. Cl.
CPC ............ *G06F 1/08* (2013.01); *H04J 3/0638* (2013.01); *H04J 3/0661* (2013.01)

(58) Field of Classification Search
CPC .......... H04J 3/0661; H04J 3/0638; G06F 1/08
See application file for complete search history.

(56) References Cited

U.S. PATENT DOCUMENTS

| 7,016,998 | B2 | 3/2006 | Mukherjee | 710/260 |
| 7,818,457 | B1 | 10/2010 | Flood et al. | 709/248 |
| 2004/0062278 | A1 | 4/2004 | Hadzic et al. | 370/503 |
| 2006/0280182 | A1 | 12/2006 | Williams et al. | 370/394 |
| 2009/0204843 | A1 | 8/2009 | Celinski et al. | 713/400 |
| 2009/0245291 | A1* | 10/2009 | Wolfe et al. | 370/503 |
| 2011/0264837 | A1 | 10/2011 | Diaz et al. | 710/261 |
| 2014/0006824 | A1 | 1/2014 | Maciocco et al. | 713/323 |
| 2014/0281036 | A1* | 9/2014 | Cutler et al. | 709/248 |

OTHER PUBLICATIONS

Ethernet Time Synchronization: Providing Native Timing Within the Network, Broadcom, 36 pages, Oct. 2008.
Milijevic, Slobodan, The basics of synchronized Ethernet, Zarlink Semiconductor Inc., EE Times—Asia, 4 pages, Apr. 20, 2009.

(Continued)

*Primary Examiner* — Albert Wang
(74) *Attorney, Agent, or Firm* — Sunstein Kann Murphy & Timbers LLP

(57) ABSTRACT

Processor clock signals are generated for each processor in a HPC system, such that all the processor clock signals are of the same frequency. Furthermore, as part of a startup (boot) procedure, a process sets all time stamp counters (TSCs) of the processors, such they indicate identical times. Each blade of the HPC system recovers a recovered clock signal from a synchronous communication network, to which the blade is coupled. The blade generates a processor clock from the recovered clock signal and provides the processor clock to processor(s) on the blade. Each chassis is coupled to a second, system-wide, synchronous communication network, and each chassis synchronizes its chassis synchronous communication network with the system-wide synchronous communication system. Thus, all the processor clock signals are generated with the same frequency.

21 Claims, 11 Drawing Sheets

(56) References Cited

OTHER PUBLICATIONS

Synchronous Ethernet (SyncE): ESMC and SSM, 14 pages, Jul. 30, 2010.

Application Note No. 21/2010, IEEE 1588 (PTP) in Communication Networks, Oscilloquartz S.A., Switzerland, 14 pages, Aug. 2010.

Silicon Labs, Si5326 Any Frequency Precision Clock Multiplier/Jitter Attenuator, Silicon Labs, 72 pages, Sep. 2010.

802.1AS—Timing and Synchronization, IEEE, http://www.ieee802.org/1/pages/802.1as.html, 14 pages, Mar. 30, 2011.

Wikipedia.org, CPU multiplier http://en.wikipedia.org/wiki/CPU_multiplier, 3 pages, Jun. 16, 2012.

Wikipedia.org, Clock recovery, http://en.wikipedia.org/wiki/Clock_recovery, 2 pages, Aug. 11, 2012.

Wikipedia.org, Precision Time Protocol, http://en.wikipedia.org/wiki/Clock_recovery, 5 pages, Jan. 15, 2013.

Wikiepedia.org, Synchronous Ethernet, http://en.wikipedia.org/wiki/Synchronous_Ethernet, 7 pages, Jan. 16, 2013.

Wikiepedia.org, Time Stamp Counter, http://en.wikipedia.org/wiki/Time_Stamp_Counter, 4 pages, Feb. 2, 2013.

Wikipedia.org, Clock skew, http://en.wikipedia.org/wiki/Clock_skew, 3 pages, Feb. 10, 2013.

Wikiepedia.org, Synchronous Ethernet, http://en.wikipedia.org/wiki/Synchronous_Ethernet, 7 pages, Feb. 15, 2013.

Wikipedia.org, Clock signal, http://en.wikipedia.org/wiki/Clock_distribution_network, 6 pages, Feb. 22, 2013.

Wikipedia.org, Clock rate, http://en.wikipedia.org/wiki/Clock_rate, 3 pages, Feb. 26, 2013.

Intel®, "Intel® 82580EB/8250DB Gigabit Ethernet Controller Datasheet," LAN Access Division (LAD), Revision: 2.5, Sep. 2012, 742 pages.

sgi®, "White Paper, SGI ICE X: Ultimate Flexibility for the World's Fastest Supercomputer," 2011, 16 pages.

United States Patent and Trademark Office, Non-Final Office Action for U.S. Appl. No. 13/828,896 dated Feb. 13, 2015, 25 pages.

Yilmaz, "Ethernet Based Real Time Communications for Embedded Systems," A Thesis submitted to the Graduate School of Natural and Applied Sciences of Middle East Technical University, May 2010, 114 pages.

* cited by examiner

GLOBAL SYNCHRONOUS CLOCK CIRCUIT AND METHOD FOR BLADE PROCESSORS

FIELD OF THE INVENTION

The invention generally relates to multi-processor high-performance computer systems and, more particularly, the invention relates to generating processor clock signals such that all processors receive processor clock signals of the same frequency.

BACKGROUND OF THE INVENTION

High-performance computer ("HPC") systems typically include many processors. However, if all the processors do not have an identical notion of a current time, or if all the processors' notions of the current time do not advance at the same rate, problems can occur. For example, an application program distributed across several processors may receive different indications of the current time, depending on which processor processes a request for the current time.

SUMMARY OF VARIOUS EMBODIMENTS

An embodiment of the present invention provides a computer that includes a first printed circuit board, which includes a memory, an integrated circuit processor, a first network port, a first physical layer interface and a clock signal distribution circuit. The integrated circuit processor is coupled to the memory. The integrated circuit processor includes a processor clock signal input port configured to receive a first processor clock signal. The integrated circuit processor is configured to execute instructions, fetched from the memory, at a speed determined by the first processor clock signal. The first network port is configured to be connectable to a first synchronous communication network. The first physical layer interface is coupled to the first network port. The first physical layer interface is configured to recover a first recovered clock signal from a signal received via the first synchronous communication network. The clock signal distribution circuit is configured to receive the first recovered clock signal, generate the first processor clock signal from the first recovered clock signal and deliver the first processor clock signal to the processor clock signal input port. The first processor clock signal delivered to the clock signal input port of the integrated circuit processor is, therefore, based on a signal generated external to the first printed circuit board.

The clock signal distribution circuit may include a clock frequency multiplier configured to generate the first processor clock signal by multiplying a frequency of the first recovered clock signal by a predetermined value.

The memory may include a memory clock signal input port configured to receive a memory clock signal. The clock signal distribution circuit may be configured to generate the memory clock signal from the first recovered clock signal and deliver the memory clock signal to the memory clock signal input port. The memory clock signal delivered to the clock signal input port of the memory may, therefore, be based on a signal generated external to the first printed circuit board.

The clock signal distribution circuit may include a jitter attenuator. The integrated circuit processor may include a register that is incremented per cycle of the integrated circuit processor.

The computer may also include a second printed circuit board, different than the first printed circuit board. The second printed circuit board may include a second memory, a second integrated circuit processor, a second network port, a second physical layer interface and a second clock signal distribution circuit. The second integrated circuit processor may be coupled to the second memory. The second integrated circuit processor may include a second processor clock signal input port configured to receive a second processor clock signal. The second integrated circuit processor may be configured to execute instructions, fetched from the second memory, at a speed determined by the second processor clock signal. The second network port may be configured to couple to the first synchronous communication network. The second physical layer interface may be coupled to the second network port, and it may be configured to recover a second recovered clock signal from a signal received via the first synchronous communication network. The second clock signal distribution circuit may be configured to receive the second recovered clock signal, receive the second recovered clock signal from the second recovered clock signal and deliver the second processor clock signal to the second processor clock signal input port.

The computer may include a housing. The first printed circuit board, the second printed circuit board and at least a portion of the first synchronous communication network may be disposed within the housing.

The computer may also include a first plurality of distinct printed circuit boards. Each distinct printed circuit board of the first plurality of distinct printed circuit boards may include a respective memory, a respective integrated circuit processor, a respective network port, a respective physical layer interface and a respective clock signal distribution circuit. The integrated circuit processor may be coupled to the memory. The integrated circuit processor may include a processor clock signal input port configured to receive a processor clock signal. The integrated circuit processor may be configured to execute instructions, fetched from the memory, at a speed determined by the processor clock signal. The network port may be configured to couple to the first synchronous communication network. The physical layer interface may be coupled to the network port. The physical layer interface may be configured to recover a first recovered clock signal from a signal received via the first synchronous communication network. The clock signal distribution circuit may be configured to receive the first recovered clock signal, generate the processor clock signal from the first recovered clock signal and deliver the processor clock signal to the processor clock signal input port.

Each integrated circuit processor may include a respective register that is incremented per cycle of the respective integrated circuit processor.

The computer may also include a controller that includes a network clock signal generator and a network switch coupled. The network clock signal generator may be configured to generate a network clock signal. The network switch may be coupled to the first synchronous communication network. The network switch may be configured to communicate, via the first synchronous communication network, with the physical layer interface in the first printed circuit board and with the physical layer interface in each distinct printed circuit board of the first plurality of distinct printed circuit boards, according to the network clock signal. The first processor clock signal delivered to the clock signal input port of the integrated circuit processor and the processor clock signal delivered to the clock signal input port of the integrated circuit processor of each distinct printed circuit board of the first plurality of distinct printed circuit boards are, therefore, each based on the network clock signal.

The controller may further include a second network port and a second physical layer interface. The second network port may be configured to couple to a second synchronous network, different than the first synchronous network. The second physical layer interface may be coupled to the second network port. The second physical layer interface may be configured to recover a second recovered clock signal from the second synchronous network. The network clock signal generator may be configured to generate the network clock signal from the second recovered clock signal.

The computer may also include a third synchronous network, a second plurality of distinct printed circuit boards and a second controller. Each distinct printed circuit board of the second plurality of distinct printed circuit boards may include a respective memory, a respective integrated circuit processor, a respective network port, a respective physical layer interface and a respective clock signal distribution circuit. The integrated circuit processor may be coupled to the memory. The integrated circuit processor may include a processor clock signal input port configured to receive a processor clock signal. The integrated circuit processor may be configured to execute instructions, fetched from the memory, at a speed determined by the processor clock signal. The network port may be configured to couple to the third synchronous network. The physical layer interface may be coupled to the network port and configured to recover a third recovered clock signal from the third synchronous network. The clock signal distribution circuit may be configured to receive the third recovered clock signal and generate the processor clock signal from the third recovered clock signal. The clock signal distribution circuit may also be configured to deliver the processor clock signal to the processor clock signal input port. The second controller may include a third network port configured to couple to the second synchronous network. The second controller may also include a third physical layer interface coupled to the third network port and configured to recover a third recovered clock signal from the second synchronous network. The second controller may also include a second network clock signal generator configured to generate a second network clock signal from the third recovered clock signal. The second controller may further include a second network switch coupled to the third synchronous network and configured to communicate, via the third synchronous network, with the physical layer interface in each printed circuit board of the second plurality of distinct printed circuit boards according to the second network clock signal.

Another embodiment of the present invention provides a computer-implemented method for setting values in a plurality of registers. Each register of the plurality of registers is associated with a respective printed circuit board. Each register is part of an integrated circuit processor of the respective printed circuit board. Each register is configured to be automatically periodically incremented by the integrated circuit processor. The method includes performing operations by a processor. The operations include: (a) selecting a master printed circuit board. (b) For each printed circuit board ("slave printed circuit board") of a plurality of printed circuit boards, the operations include performing operations (c) to (g): (c) Invoking a BIOS of the slave printed circuit board. The invocation is performed by a BIOS of the master printed circuit board. (d) In response to the invocation, reading a value of a first register of the master printed circuit board. The first register of the master circuit board is configured to be periodically automatically incremented. The reading is performed by the BIOS of the slave printed circuit board. (e) Calculating a value for the register associated with the slave printed circuit board, based at least in part on the value of the first register of the master printed circuit board. The calculating is performed by the BIOS of the slave printed circuit board. (f) Storing the calculated value for the register in the register. The storing is performed by the BIOS of the slave printed circuit board. (g) If another slave printed circuit board of the plurality of printed circuit boards remains to be processed, selecting a different slave printed circuit board. The selecting is performed by the BIOS of the master printed circuit board.

Reading the value of the first register of the master printed circuit board may include three operations. The first operation includes initiating reading a first value of the register associated with the slave printed circuit board. The second operation includes, after initiating the reading of the first value of the register, initiating reading a value of the first register of the master printed circuit board. The third operation includes, after initiating the reading the first register of the master printed circuit board, initiating reading a second value of the register associated with the slave printed circuit board. The value of the first register of the master printed circuit board is associated with a value between the first value of the register associated with the slave printed circuit board and the second value of the register associated with the slave printed circuit board.

Calculating the value for the register associated with the slave printed circuit board may include estimating a value of a second register of the master printed circuit board, based at least in part on the value of the first register of the master printed circuit board, thereby yielding an estimated value of the second register. The second register on the master printed circuit board is configured to be automatically periodically incremented. The estimating is based at least in part on a ratio of a rate at which the first register on the master printed circuit board is incremented to a rate at which the second register on the master printed circuit board is incremented. Calculating the value for the register associated with the slave printed circuit board includes calculating the value for the register associated with the slave printed circuit board based at least in part on the estimated value of the second register.

Calculating the value for the register associated with the slave printed circuit board includes calculating an offset between a value of the register associated with the slave printed circuit board and a value of the second register of the master printed circuit board.

Operations (d) and (e) may be repeated a number of times. Operations (d) and (e) and the three operations described above, associating the value of the first register of the master printed circuit board, as described above, estimating a value of a second register of the master printed circuit board and calculating an offset between a value of the register associated with the slave printed circuit board and a value of the second register of the master printed circuit board, as recited above, may be repeated a number of times.

Yet another embodiment of the present invention provides a method for clocking a plurality of integrated circuit processors at a common frequency. Each processor of the plurality of processors is on a respective printed circuit board computer. Each printed circuit board computer is a member of a plurality of printed circuit board computers. The method includes coupling the plurality of printed circuit board computers to a synchronous communication network, such as a synchronous Ethernet network. For each printed circuit board computer of the plurality of printed circuit board computers, a recovered clock signal is recovered from a signal received via the synchronous communication network. In addition, a processor clock signal is generated from the recovered clock signal and the processor clock signal is delivered to the integrated circuit processor of the printed circuit board computer.

The processor executes instructions at a rate determined by a frequency of the processor clock signal. Thus, the processor clock signal delivered to the integrated circuit processor is based on a signal generated external to the printed circuit board computer.

An embodiment of the present invention provides a method for setting a value in each register of a plurality of registers. Each register is associated with a respective printed circuit board computer. Each register is part of an integrated circuit processor of the respective printed circuit board computer. Each register is configured to be automatically periodically incremented by the integrated circuit processor. Each printed circuit board computer has a respective real-time clock, distinct from the register. A real-time clock is periodically incremented to contain a representation of the current time, although that representation can be in any format, not necessarily hours, minutes and seconds. Each real-time clock is a member of a plurality of real-time clocks.

The method includes sending, from a master node, at least one message containing a start time. Each message of the at least one message contains an identical start time. That is, all the messages contain the same start time, although the start time may be represented differently in each of the messages. Nevertheless, all the start times are equivalent to each other. Each printed circuit board computer receives at least one of the messages.

The method also includes synchronizing the plurality of real-time clocks with a single master real-time clock. That is, all the real-time clocks are synchronized with the same master real-time clock. After synchronizing the plurality of real-time clocks, the integrated circuit processor on each printed circuit board computer is released from a reset state at the start time, according to the real-time clock on the printed circuit board computer. Thus, each register of the plurality of registers initially stores a common value and is, thereafter, periodic incremented. For example, all the registers may initially contain zero and, after the processors are released from the reset state, all the registers may be incremented.

Each printed circuit computer may be coupled to a synchronous communication network. Each printed circuit board computer may recover a recovered clock signal from a signal received via the synchronous communication network. On each printed circuit board computer, a processor clock signal is generated from the recovered clock signal and the processor clock signal is delivered to the integrated circuit processor of the printed circuit board computer. The register is incremented at a rate determined by a frequency of the processor clock signal.

Some illustrative embodiments of the invention are implemented as a computer program product having a tangible, non-transitive computer-usable medium with computer readable program code stored thereon. The computer readable program code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
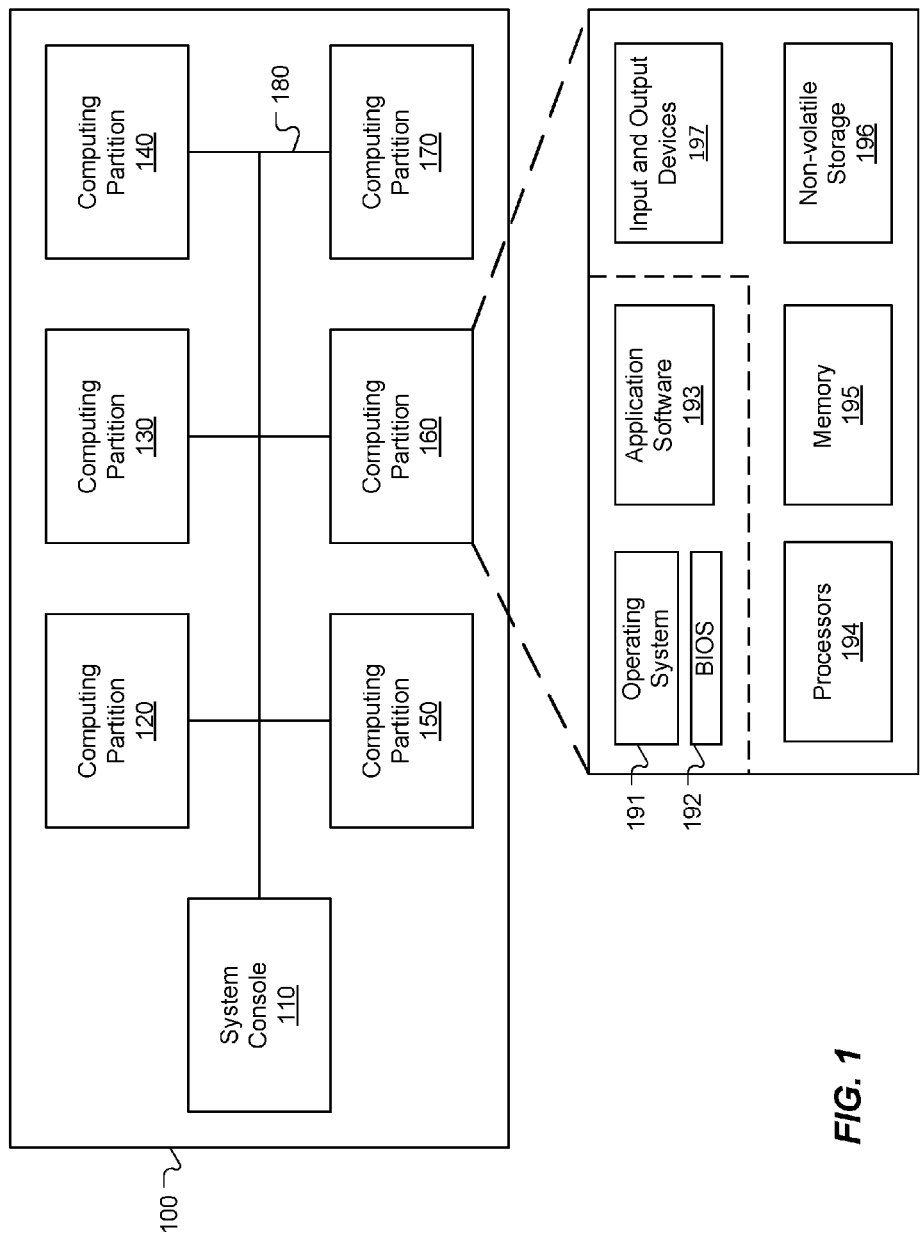
FIG. 1 schematically shows a logical view of an HPC system in accordance with one embodiment of the present invention.

In illustrative embodiments, processor clock signals are generated for each processor in a high-performance computer (HPC) system, such that all the processor clock signals are of the same frequency. Furthermore, as part of a startup (boot) procedure, a process sets all time stamp counters (TSCs) of the processors, such they indicate identical times.

Each node of a HPC system recovers a recovered clock signal from a synchronous communication network, to which the node is coupled. The node generates a processor clock signal from the recovered clock signal and provides the processor clock signal to the processor(s) on the node. Because all nodes of a chassis are coupled to a single chassis synchronous communication network, all the nodes' recovered clock signals are of the same frequency and, consequently, all the processor clock frequencies are identical.

Each chassis is coupled to a second, system-wide, synchronous communication network, and each chassis synchronizes its chassis synchronous communication network with the system-wide synchronous communication system. Thus, all the processor clock signals are generated with the same frequency. Details of illustrative embodiments are discussed below.

DEFINITIONS

As used herein, the following terms have the following definitions, unless their contexts indicates otherwise.

Computer—an electronic system that includes a memory that stores coded instructions and a processor coupled to the memory and configured to fetch and execute the instructions.

Integrated circuit processor (also referred to as a "microprocessor")—a processor implemented in a single integrated circuit. Hardware within a processor carries out instructions of a computer program by performing basic arithmetical, logical and input/output operations. Two typical components of a processor include an arithmetic logic unit (ALU), which performs arithmetic and logical operations, and a control unit (CU), which extracts instructions from memory and decodes and executes them, calling on the ALU when necessary. Some microprocessors contain multiple processors in a single integrated circuit. Such a microprocessor is commonly referred to as a "multi-core processor." Processor are typically used as central processor units (CPUs), graphical processor units (GPUs), digital signal processors (DSPs) and the like.

Clock signal—a periodic electrical signal that oscillates between two discrete states, typically a high (typically designated "1") state and a low (typically designated "0") state. The oscillation occurs at a rate (a "clock rate" or "clock frequency"). A clock signal is used to coordinate actions of a circuit, such as a processor. Circuits using a clock signal for synchronization may become active at each rising edge, each falling edge or both edges of the clock signal. For example, after each clock signal pulse, signal lines in a processor need time to settle to their new states. In many cases, more than one clock signal cycle is required to perform a given action. For example, a processor may require more than one clock signal cycle to execute a single instruction. Some processors generate internal clock signals that are multiples of an externally supplied (i.e., external to the processor integrated circuit) processor clock signal.

Figure 4:
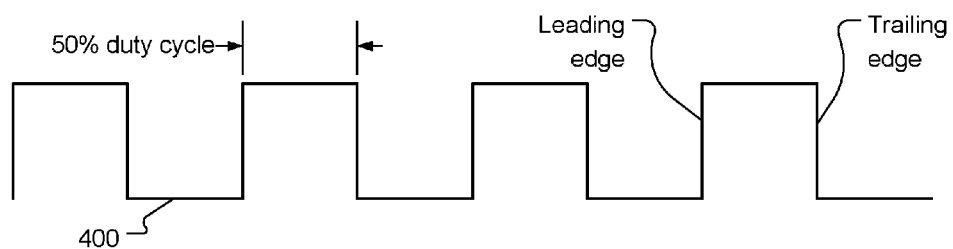
FIG. 4 illustrates an exemplary one-phase clock signal waveform, according to the prior art.
Figure 5:
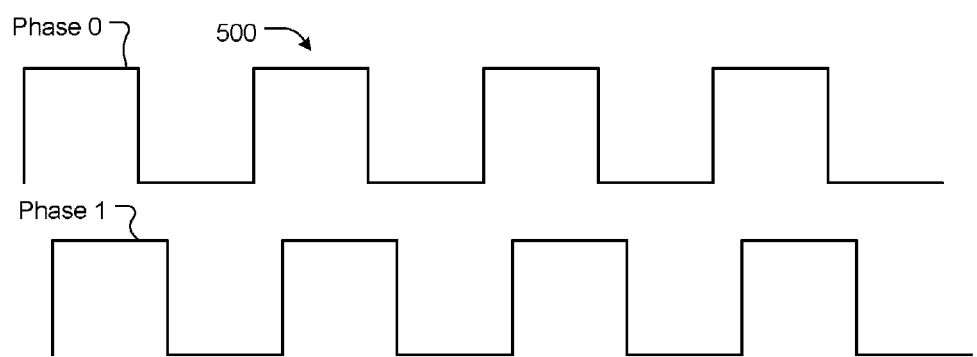
FIG. 5 illustrates an exemplary two-phase clock signal waveform, according to the prior art.

Clock signals typically have square waveforms with a 50% duty cycle, as illustrated by an exemplary hypothetical clock signal waveform 400 in FIG. 4, although some clock signals have other waveforms and other duty cycles. The clock signal 400 shown in FIG. 4 is a single-phase clock, i.e., a signal that can be transmitted on effectively one wire (with reference to a ground). Multi-phase clocks signals include more than one signal, typically transmitted via multiple wires (with reference to a ground), where the second (and any subsequent) signal(s) is (are) delayed by a fixed amount of time, relative to the first signal. FIG. 5 illustrates an exemplary hypothetical two-phase clock signal 500. Although a clock signal is typically generated at a fixed frequency, in some circumstances the frequency may be changed during operation, such as lowered to operate a processor at a slower speed to conserve energy.

As used herein, the term "clock signal" does not mean a signal or data representing a current time of day or contents of a register or location that is incremented at a regular rate.

Clock signal generator (also referred to as a "clock")—a circuit that generates a clock signal. In some cases, a clock signal generator uses a reference, such as mechanical resonance of a vibrating crystal of piezoelectric material such as quartz, to generate a very precise frequency clock signal. A common example of a clock signal generator is a circuit that generates a processor clock signal.

As used herein, the unqualified term "clock" does not mean a register or location that is incremented at a regular rate.

Clocking—providing to an integrated circuit processor or to another component a clock signal, such as a processor clock signal.

Synchronous communication network (also referred to as a "synchronous network")—a computer network in which network elements operate synchronously, such as with respect to times at which frames are sent and received and beginning times of bits within frames. Synchronous network elements negotiate communication parameters at a data link layer before communication begins. For example, network elements on both ends of a network link may synchronize their clock signals before transmission begins.

Time stamp counter (TSC)—a register in a processor, used to count processor cycles since the processor was released from its reset state, i.e., since the processor began executing instructions, or since the TSC was reset. In some processors, the TSC is incremented once per internal processor clock cycle, which may be determined by a core-clock to bus clock ratio. In some processors, the TSC is incremented at a constant rate, such as a rate determined by a maximum core-clock to bus clock ratio or a rate determined by a maximum resolved frequency at which the processor is started, which may be different than a maximum qualified frequency of the processor. A TSC may be used to measure passage of real time.

System Architecture

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
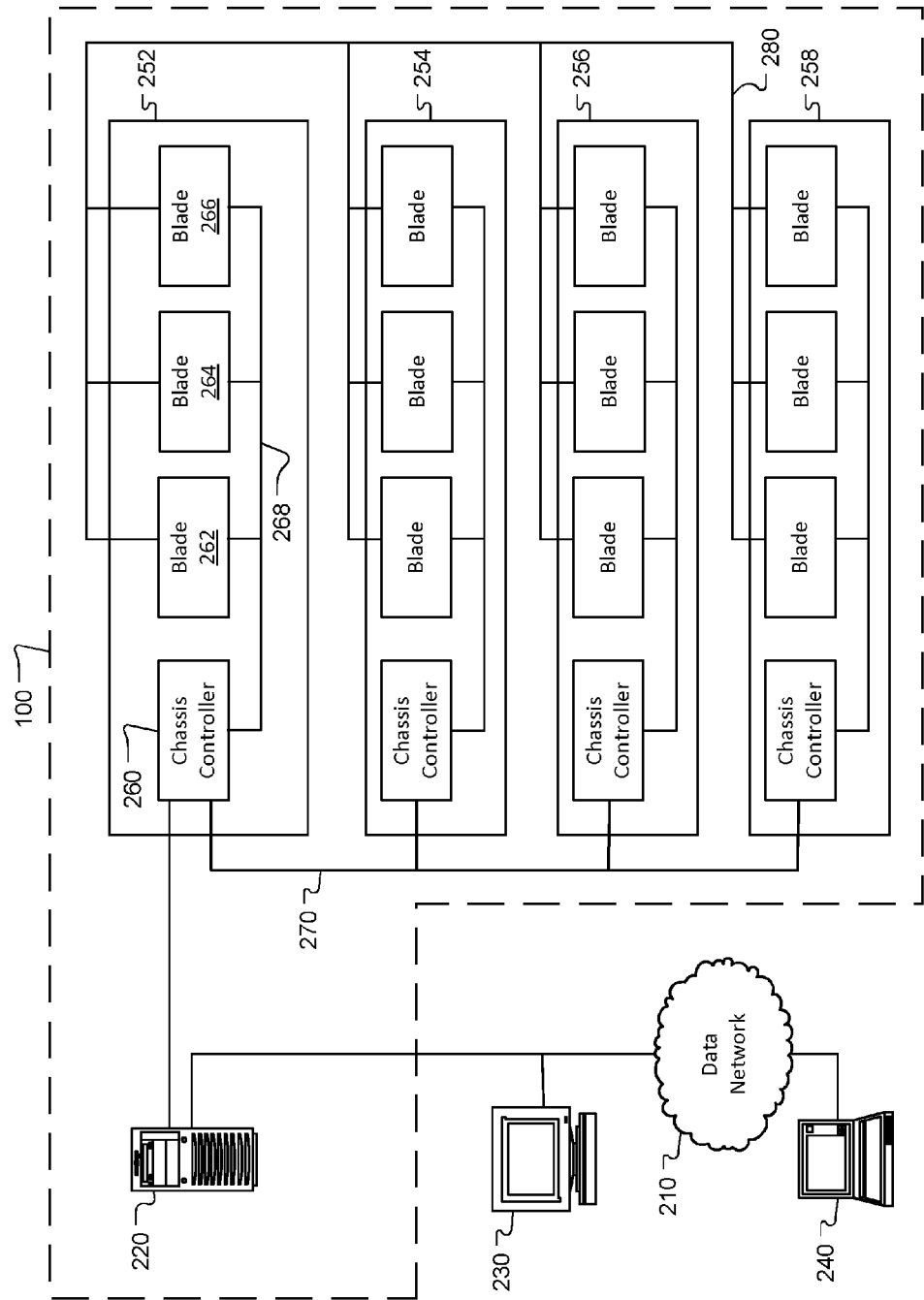
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which may be any suitable network, such as a customer local area network ("LAN"), a virtual private network ("VPN"), the Internet, a combination of these networks or the like. Any of these networks may permit a number of users to access the HPC system resources remotely and/or simultaneously. For example, the management node 220 may be accessed by a customer computer 230 by way of remote login using tools known in the art such as Windows® Remote Desktop Services or the Unix secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of microprocessors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
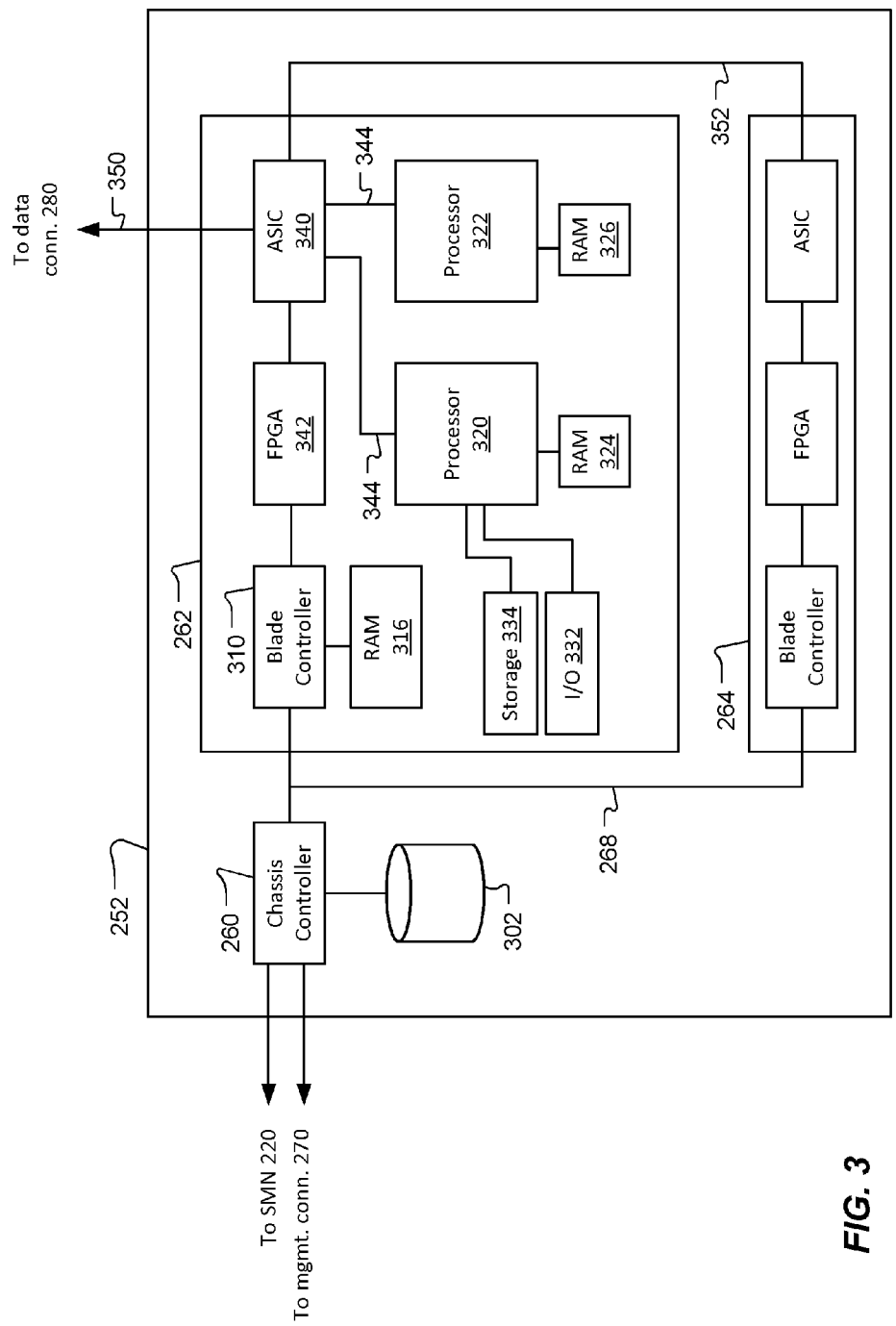
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326. Blade 262 may be alternatively configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 by way of a field-programmable gate array ("FPGA") 342 or similar programmable device for passing signals between integrated circuits. In particular, signals are generated on output pins of the blade controller 310, in response to commands issued by the chassis controller 260. These signals are translated by the FPGA 342 into commands for certain input pins of the hub ASIC 340, and vice versa. For example, a "power on" command received by the blade controller 310 from the chassis controller 260 requires, among other things, providing a "reset" signal to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "reset" signal to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, a customer may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made to a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and multiple blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Global Synchronous Clock

As noted, upon booting, the BIOS presents to the operating system a view of partition hardware as if it were all present in a single, very large computer, even if the hardware itself is scattered among multiple blade chassis and blades. In this way, a single operating system instance spreads itself across some, or preferably all, of the blades and blade chassis that are assigned to its partition. Once the operating system is safely executing, its partition may be operated as a single logical computer. However, all processors of the partition should have identical notions of time, including what time it is and a rate at which time advances. As noted, a TSC within a processor is often used to measure passage of real time and, therefore, a value of a TSC may be used as an indication of a current real time.

Most operating systems include facilities to handle system calls from application programs, by which the application programs request performance of services by the operation systems, such as allocation of memory or initiation of I/O operations, and/or return of information, such as status of a previously initiated I/O operation or a current time of day. If different processors have different notions of what time it is, a single instance of an operating system distributed across the processors may return different values when requested for the time of day, depending on which processor executes the system call. These different values can lead to problems.

For example, if one or more application programs are being executed under control of a single operating system distributed across multiple processors, and the application program(s) store data, along with time stamps indicating when the data is stored, the time stamps should accurately reflect the order in which the data is stored. However, if one processor's notion of what time it is is behind another processor's notion of what time it is, and these two processors execute sequential data storage and time stamp requests at nearly the same time, the two sequentially stored data items may have time stamps that (incorrectly) indicate the data items were stored in reverse time order.

Even if two processors have identical notions of current time, if the two processors operate at different speeds, their respective notions of current time may drift apart over time. Thus, it can be important for multiple processors to operate synchronously.

In the prior art, each processor integrated circuit, or at least each printed circuit board computer, has a clock signal generator, typically driven from a quartz crystal mounted on the circuit board. A clock signal distribution network (sometime referred to as a "clock signal distribution tree") distributes clock signals from the clock signal generator to the processor, memory and, in some cases, other circuits on the printed circuit board.

Although quartz crystal-based clock signal generators can generate quite accurate and stable clock signals, a small difference in frequency between quartz crystals on two different printed circuit boards can lead to slightly different processor clock signal frequencies. Quartz crystals have tolerances. Thus, no two quartz crystals oscillate at exactly the same frequency. Furthermore, quartz crystals and other oscillators are temperature sensitive. Thus, printed circuit board computers operating at different temperatures may operate at different processor clock signal frequencies. Consequently, blades of a conventional HPC operate at slightly different frequencies, even if the blades are installed in a single chassis. As noted, such differences in frequencies of operation can pose problems.

Embodiments of the present invention solve this problem. As noted, each blade is coupled to a local management bus. For example, as discussed with respect to FIG. 2, each blade 262-266 in chassis 252 is coupled to local management bus 268. Each of these blades 262-266 recovers a clock signal from the local management bus 268. For example, the local management bus 268 may be a synchronous communication network, such as a synchronous Ethernet network, and the chassis controller 260 may synchronize communications over the local management bus 268. Each blade 262-266 uses the recovered clock signal to generate a local clock signal or a set of local clock signals, including a processor clock signal. Each blade 262-266 provides its local clock signal to its processor(s). Because all the local clock signals on all the chassis 262-266 are derived from a single base, i.e., the synchronous communication network 268, all the local clock signals on the blades 262-266 are of the same frequency. Consequently, all the processors on the blades 262-266 operate at the same frequency. Each blade 262-266 may generate a set of local clock signals, each local clock signal having a different frequency, as required by the processors or other components, such as memories, I/O controllers, local busses, etc., on the blades 262-266. Thus, all like components on the blades 262-266 may operate at identical frequencies.

As noted, the chassis controller 260 of the chassis 252 synchronizes communications over the local management bus 268. Similarly, each of the other chassis controllers synchronizes communications over its respective local management bus.

All the chassis controllers are interconnected via a management connection 270, which is another synchronous communication network, such as another synchronous Ethernet. Each chassis controller recovers a clock signal from the management connection 270 and uses the recovered clock signal to synchronize communications over its respective local management bus. Thus, all the local management busses are synchronized with the management connection 270 and, consequently, all the processors on all the blades of all the chassis 252-258 operate at the same frequency. Similarly, all like components on all the blades of all the chassis 252-258 operate at identical frequencies.

Figure 6:
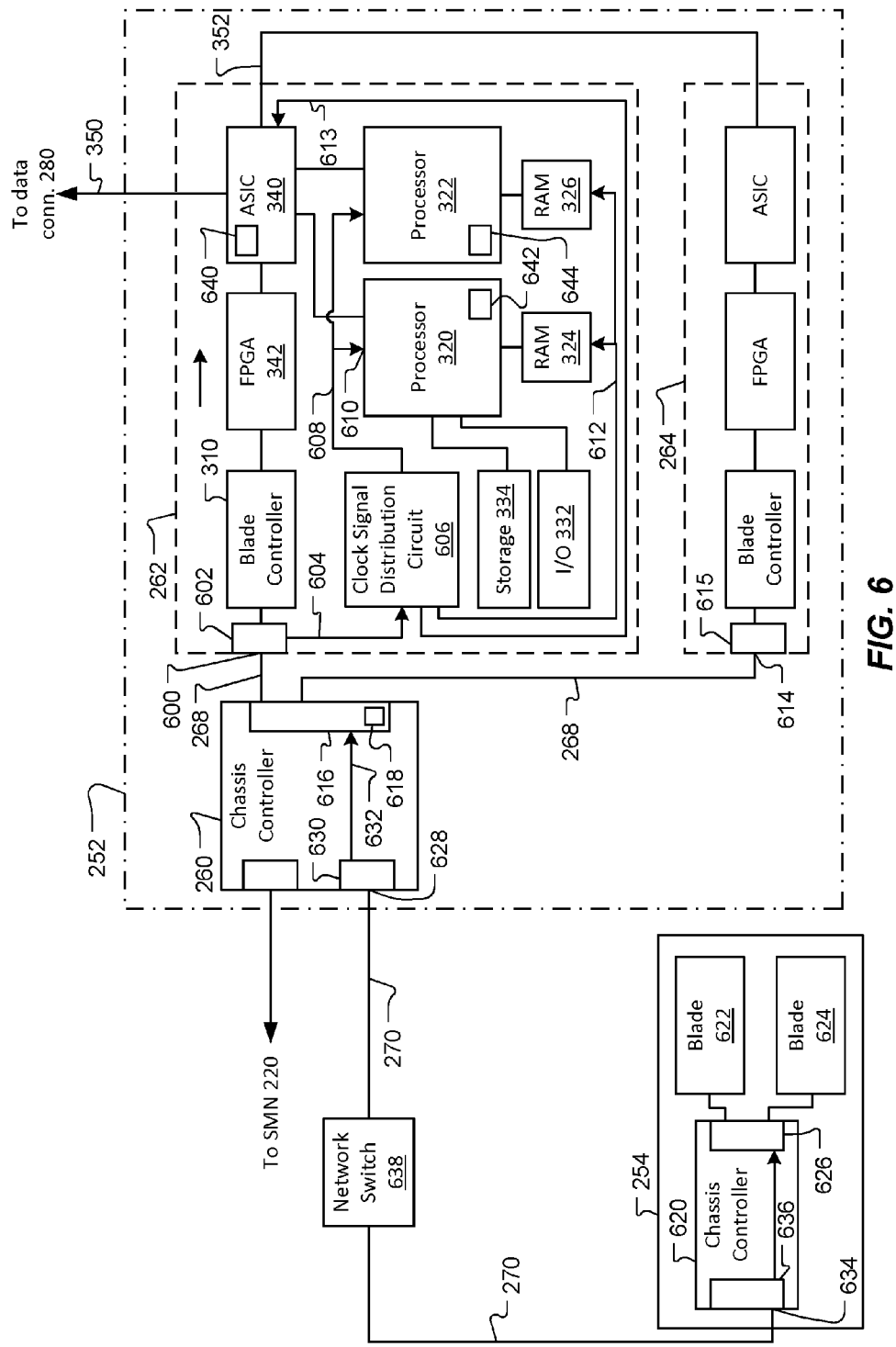
FIG. 6 is a more detailed schematic block diagram of the blade chassis of FIG. 3, plus a second blade chassis.

FIG. 6 provides a schematic block diagram of an embodiment of the present invention, similar to the diagram of FIG. 3, but with additional details. As noted, the blade 262 is coupled to the local management bus 268. The blade 262 is coupled to the local management bus 268 via a network port 600 and a physical layer interface (PHY) 602, as is well known in the art. The port 600 may include a set of printed circuit board pins that couple with a backplane jack, which is soldered to a chassis backplane that includes a synchronous Ethernet and interconnects the other blades 262, 264, etc. and the chassis controller 260 of the chassis 252. The PHY 602 may be implemented with a 10/100/1000BASE-T transceiver. Such a transceiver is available from Broadcom Corporation, Irvine, Calif. 92617, under part number BCM546165. Preferably, the local management bus 268 operates at 100 MHz.

The PHY 602 recovers a recovered clock signal 604 from a signal received via the first synchronous communication network 268. In an embodiment, the recovered clock signal 604 has a frequency of about 25 MHz, although other frequencies may be used. A clock signal distribution circuit 606 receives the recovered clock signal 604, generates a suitable processor clock signal 608 from the recovered clock signal 604 and delivers the processor clock signal 608 to a processor clock signal input port 610 on the processor 320. The processor clock signal 608 frequency may be a multiple of the recovered clock signal 604 frequency. In an embodiment, the processor clock signal 608 has a frequency of about 100 MHz, although any suitable processor clock signal frequency may be used. Similarly, the clock signal distribution circuit 606 delivers the processor clock signal 608 to a processor clock signal input port on the other processor 322.

If the memories 324 and 326 require memory clock signals, the clock signal distribution circuit 606 generates a suitable memory clock signal 612 from the recovered clock signal 604 and delivers the memory clock signal 612 to memory clock signal input ports on the memories 324-326. If the ASIC 340 requires a clock signal, the clock signal distribution circuit 606 generates a suitable ASIC clock signal 613 from the recovered clock signal 604 and delivers the ASIC clock signal 613 to the ASIC 340. Similarly, if other components require clock signals, the clock signal distribution circuit 606 generates suitable clock signals (not shown) from the recovered clock signal 604 and delivers the clock signals to the other components. The memory clock signal 612 frequency and the other clock signal's frequencies may be respective multiples of the recovered clock signal 604 frequency.

The processor clock signal 608, the memory clock signal 612 and/or any of the other generated clock signals may be generated directly or indirectly from the recovered clock signal 604. That is, some of the generated clock signals may be generated from other of the generated clock signals. However, if some of the generated clock signals are generated from other of the generated clock signals, at least one of the generated clock signals is generated from the recovered clock signal 604. Nevertheless, all the generated clocks signals are referred to as being based on the recovered clock signal. Thus, the processor clock signal 608 delivered to the clock signal input port 610 of the integrated circuit processor 320 is based on a signal generated external to the printed circuit board of the blade 262, i.e., a signal that arrives at the blade 262 via the local management bus 268.

Each blade includes a network port and a physical layer interface (PHY), as exemplified by a network port 614 and PHY 615 in the blade 264. Each blade also includes a clock signal distribution circuit coupled to its respective processors, memories, etc. (not shown in FIG. 6 for simplicity), as described above.

The chassis controller 260 includes a network switch 616 and separate or included PHYs and network ports coupled to the synchronous communication network 268. As with the blades 262, 264, the ports may be implemented with pins on a printed circuit board of the chassis controller 260, which couple to a jack soldered to the chassis backplane. The switch 616 includes a network clock signal generator 618, which generates a network clock signal that controls communications over the synchronous communication network 268. The network switch 616 may be implemented with any suitable circuit, such as an Ethernet switch available from Broadcom Corporation under part number BCM53202S. Thus, the processor clock signal 608 delivered to the clock signal input port 610 of the integrated circuit processor 320 and the processor clock signal delivered to a second clock signal input port of the an integrated circuit processor in blade 264 are each based on a signal from the local management bus 268, thus these processor clock signals will have identical frequencies.

As noted, each of the other chassis, exemplified by chassis 254, has a respective chassis controller, exemplified by chassis controller 620, and one or more blades, exemplified by blades 622 and 624. The chassis controller 620 includes a network switch 626, which includes a network clock signal generator (not shown), as described above, with respect to chassis controller 260. Thus, each chassis's local management bus is operated according to its respective chassis network clock signal generator.

The chassis controller 260 also includes a network port 628 and a PHY 630 for coupling the chassis controller 260 to the management connection 270. The network port 628 may be, for example, an RJ-45 jack. The PHY 630 is coupled to the network switch 616, thus network traffic can flow between the management connection 270 and the local management bus 268. As noted, the management connection 270 is another synchronous network, such as another synchronous Ethernet. The PHY 630 recovers a recovered clock signal from the synchronous communication network 270 and delivers the recovered clock signal 632 to the network switch 616, thus synchronizing the local management bus 268 to the management connection 270. That is, the network clock signal generator 618 in the chassis controller 260 is synchronized with the synchronous communication network 270 and, consequently, the recovered clock signals in the respective blades 262 and 264 are all of the same frequency, and the processor clock signals generated from the recovered clock signals are all of the same frequency.

A network switch 638 controls communication over the synchronous communication network 270. In particular, a clock signal generator in the network switch 638 may generate a network clock signal that synchronizes communications over the synchronous communication network 270. Preferably, the management connection operates at 1,000 MHz.

As with the chassis controller 260, the other chassis controllers, exemplified by chassis controller 260, include respective network ports, exemplified by network port 634 coupled to the synchronous communication network 270, and respective PHYs, exemplified by PHY 636. Thus, processor clock signals generated by the blades 622 and 624 in the chassis 254 are all of the same frequency as each other, and they are all of the same frequency as the processor clock signals generated by blades 262 and 264 in the other chassis 252.

As a result of all the processor clock signals having the same frequency, all the TSCs, exemplified by TSCs 642 and 644, in the respective processors are incremented at the same rate. Consequently, time advances at the same rate on all processors.

Figure 7:
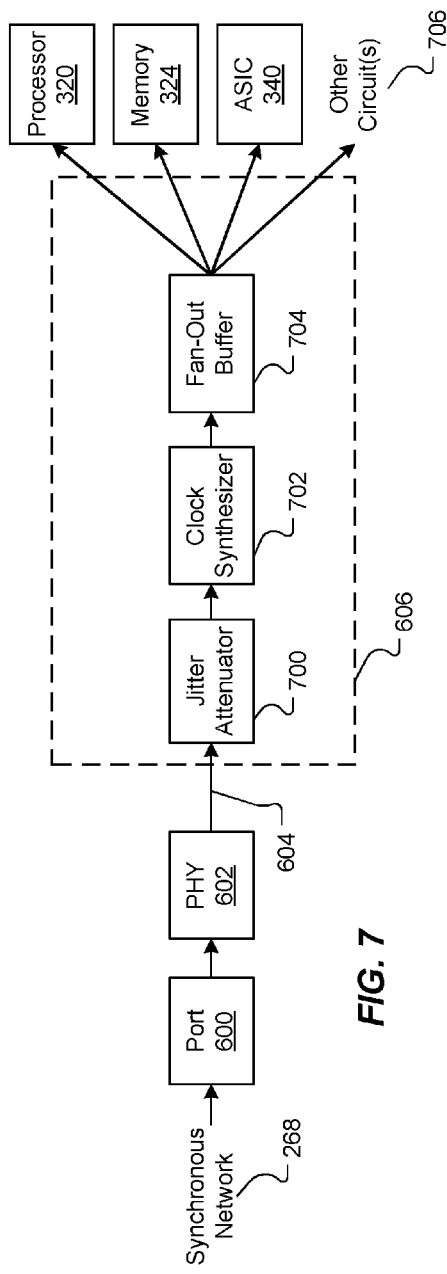
FIG. 7 is a more detailed schematic block diagram of a clock signal distribution circuit of FIG. 6, according to an embodiment of the present invention.

FIG. 7 is a schematic block diagram showing additional details about clock signal recovery and clock signal generation. As noted, each blade recovers a recovered clock signal from a synchronous communications network, to which the blade is coupled. Using the blade 262 (FIG. 6) as an example, and as noted, the port 600 is coupled to the synchronous communication network 268, and the PHY 602 is coupled to the port 600. The PHY 602 recovers the recovered clock signal 604 and provides the recovered clock signal 604 to the clock signal distribution circuit 606.

The clock signal distribution circuit 606 includes a jitter attenuator 700 to condition the recovered clock signal 604, including noise filtering and frequency averaging (jitter reduction). A precision clock multiplier/jitter attenuator, such as part number Si5326 available from Silicon Laboratories, Inc., Austin, Tex. 78701, or another suitable circuit may be used. Output from the jitter attenuator 700 is fed to a clock synthesizer 702 to generate one or more frequency clock signals required by one or more of: the processor 320, the memory 324, the ASIC 340 and any other circuits 706 on the blade that require clock signals. In some embodiments, the clock signal distribution circuit 606 supplies one or more clock signals to a subset of the components (i.e., the processor 320, etc.) that require clock signals, and another circuit (not shown) supplies one or more clock signals to the remainder of the components. A suitable clock synthesizer is part number CK420B or a similar circuit, which is available from Integrated Device Technology, Inc. (IDT), San Jose, Calif. 95138, under part number 932SQ420. If necessary, a fan-out buffer 704 is disposed between the clock synthesizer 702 and some or all of the circuits 320, 324, 340 and 706 that consume the clock signals. Suitable clock synthesizers and fan-out buffers are available from Integrated Device Technology, Inc. (IDT), San Jose, Calif. 95138.

Figure 8:
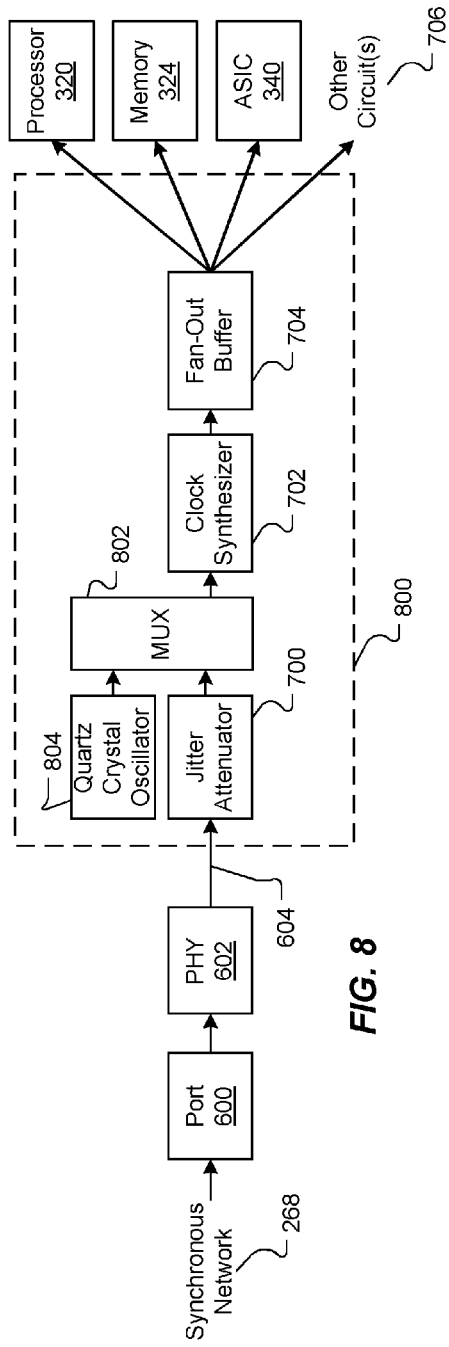
FIG. 8 is a schematic block diagram of a clock signal distribution circuit of FIG. 6, according to an alternative embodiment of the present invention.

FIG. 8 shows an alternative clock signal distribution circuit 800. In this embodiment, a multiplexor (MUX) 802 is disposed in the signal path between the jitter attenuator 700 and the clock synthesizer 702 to select either the signal output by the jitter attenuator 700 or a signal from a quartz crystal oscillator or other local frequency reference 804 to drive the clock synthesizer 702. Such an arrangement provides flexibility to select either: (a) generating the clock signals from the clock signal recovered from the synchronous network or (b) generating the clock signals from the local frequency reference 804, such as if the blade is not coupled to a synchronous network, such as when the blade is removed from the chassis for testing.

In yet another alternative embodiment (not shown), a quartz crystal excites a clock synthesizer, which is connected to one input of a MUX, and a jitter attenuator is connected to another input of the MUX. An output of the MUX drives a fan-out buffer. In this case, a single frequency clock signal is delivered by the fan-out buffer to components that consume clock signals.

The chassis controllers 260 and 620 (FIG. 6) may include similar clock signal distribution circuits to recover clock signals from the management connection 270, attenuate jitter and generate any necessary clock signals, such as to drive the network clock signal generator 618.

Optionally, the chassis controllers 260 and 620 may include MUXes and local frequency references, as shown in FIG. 8, to provide an option of locally generating a clock signal for synchronizing the chassis' respective local management bus 268.

Although the circuits described above are suitable for supplying identical frequency processor clock signals to all the processors of the blades of a HPC system and, therefore, causing all the TSCs in the processors to be incremented at identical frequencies, the individual processors or blades may be started ("booted") at different times. Therefore, the TSCs in the processors may begin being incremented at different times. Indeed, in many contexts, it desirable to stagger the start times of the blades. Consequently, all the TSCs are unlikely to simultaneously contain identical values, even though all the values are incremented at the same rate. Thus, a further mechanism may be necessary to synchronize the values in the TSCs, preferably as part of the startup (boot) procedure. Such a mechanism will now be described.

The ASIC 340 (FIG. 6) includes a real-time clock (RTC) 640, which is incremented at a fixed rate. The RTCs in the ASICs of the blades are synchronized according to a method described in U.S. Pat. No. 8,036,247 titled "System and Method of Synchronizing Real Time Clock Values in Arbitrary Distributed Systems" by Paul R. Frank, et al. and assigned to the assignee of the present application, the entire contents of which are hereby incorporated by reference herein. Consequently, all the RTCs indicate identical (within limits of the method used to synchronize them) times-of-day. However, the RTCs are not incremented as frequently as the TSCs. Therefore, the RTCs are not as precise as the TSCs, and the TSCs cannot be synchronized by simply copying a given blade's RTC contents into the TSCs of the blade, even taking into consideration the difference in rates at which the TSC and RTC are incremented. In addition, a TSC on one blade is not directly accessible by a processor of another blade, and a request for indirect access to the TSC would incur too much latency to accurately synchronize TSCs. Furthermore, access by a processor 320 or 322 to the RTC 640 is slower than access by the processor to the TSC, because the TSC is part of the processor.

Figure 9:
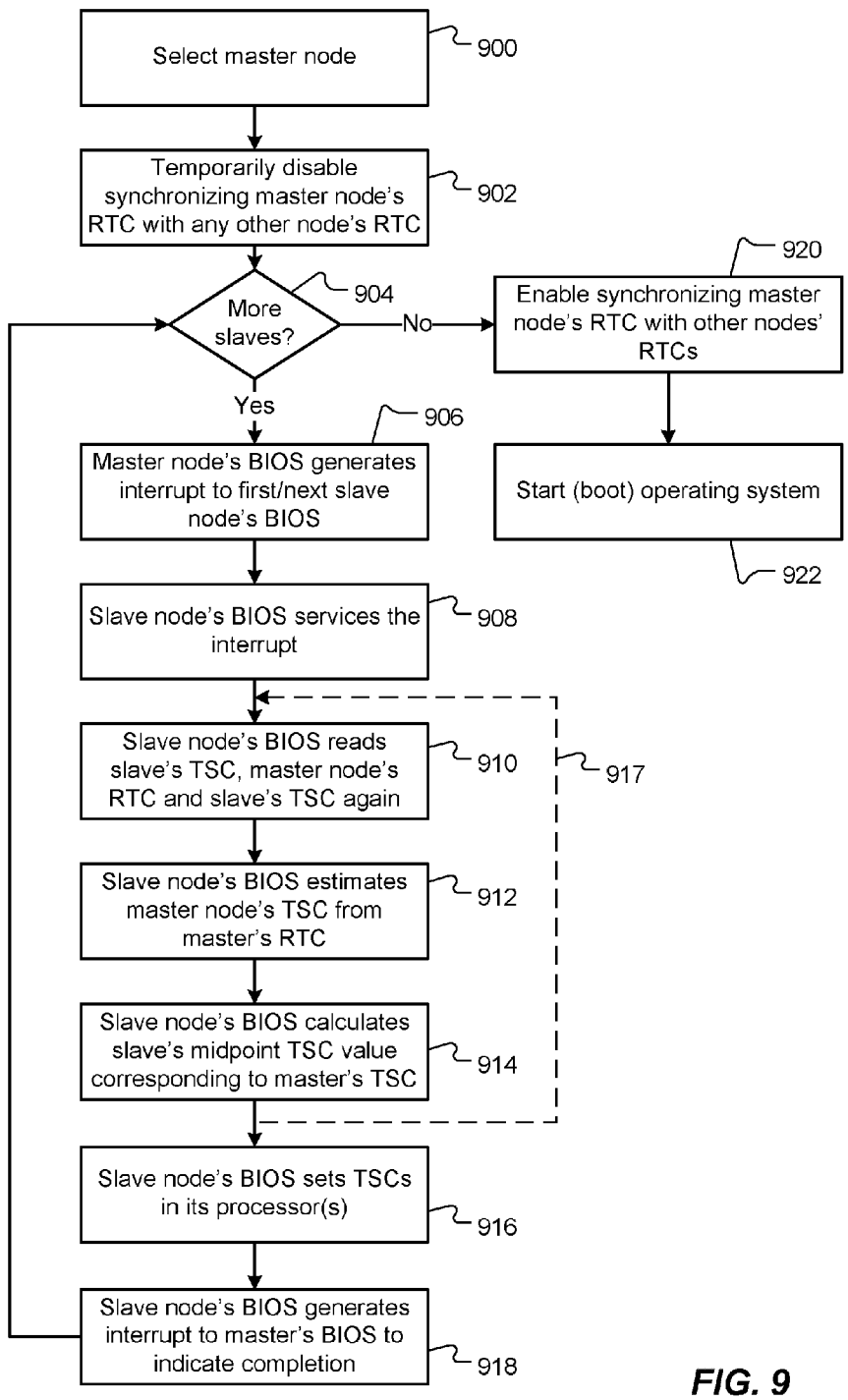
FIG. 9 is a flowchart of a process for synchronizing time stamp counters (TSCs) of blades of a HPC system, according to an embodiment of the present invention.

FIG. 9 contains a flowchart illustrating a process for setting the TSCs of the blades of a HPC system. At 900, a master node is selected. The master node may be one of the blades of the HPC system. The selection may be arbitrary, or some preference may be given to one or more blades, based on other requirements. At 902, synchronization of the master node's RTC is temporarily disabled, that is, the master node's RTC value is temporarily prevented from being changed so as to match another node's RTC value, so as to ensure the master node's RTC advances (is incremented) monotonically and regularly throughout the process of setting the other blades' TSCs. In addition, the master node sets its TSC. Because the TSC advances at a rate that is a fixed multiple of the rate at which the RTC advances, the master node's TSC may be set equal to a multiple of the master node's RTC, plus an offset that represents the time at which the TSC is set. For purposes of this discussion, the master node's RTC is considered to contain a correct time of day (taking into account a base date and a rate at which the RTC is incremented, that is, the RTC need not literally contain the current time of day, merely a value from which the current date and time of day can be calculated).

All the blades of the HPC system that are to have their TSCs set, other than the master node, are referred to as slave nodes, for purposes of this process. The master node stores information about its TSC and its RTC in a memory that is accessible by the slave nodes, such as RAM 324 or 326. This information describes a ratio of the rates at which the master node's RTC and TSC advance. The information also includes any offset that represents the time at which the TSC is set.

At 904, if at least one more slave node needs to have its TSC set, control passes to 906, where the master node's BIOS selects the first or next slave node and generates an interrupt to the selected slave node. At 908, the selected slave node's BIOS services the interrupt.

Because a processor 320 or 322 (FIG. 6) in the slave node is executing instructions stored in the BIOS, the TSC should already be incrementing.

However, if a register other than the TSC in the slave node is used for this process, and the register is not already being incremented, the slave's BIOS causes the register to begin being incremented. At this point, the initial value of the TSC is unimportant, but a regularly advancing TSC is helpful. As indicated at 910, servicing the interrupt includes initiating reading the slave's TSC, reading the master node's RTC and then, once the master node's RTC value is received, reading the slave's TSC again. These reads are performed preferably in as rapid a sequence as possible. The sequence is depicted schematically in FIG. 10 as 1, 2 and 3, respectively.

The master node's RTC value advances, as indicated by arrow 1000, and the slave node's TSC advances, as indicated by arrow 1002. Other arrows indicate the slave node's TSC value 1006 the first time the TSC is read 1 and the slave node's TSC value 1008 the second time the TSC is read 3. A difference 1004 between the two values 1006 and 1008 indicates an amount of time taken to read the master node's RTC, which can be taken as a maximum uncertainty in the value returned by the master RTC to the slave. This uncertainty does not represent inaccuracy of the master node's RTC. Rather, this amount of time 1004 represents uncertainty about when the master node's RTC was read.

In some embodiments, if the uncertainty is less than a predetermined value, such as about 1200 TSC units, the read value of the master node's RTC is considered "good," and the value of the slave node's TSC midway 1010 between the two read TSC values 1006 and 1008 is associated with the value returned from the master node's RTC. The predetermined limit on uncertainty may be selected, at least in part, based on speed of the processor 320 or 322 (FIG. 6). Faster processors may need larger limits on uncertainty, because faster processor increment their TSCs faster, whereas round-trip transit time of the read of the master node's RTC is not likely to be reduced by a faster processor. In other embodiments, the difference 1004 between the two values 1006 and 1008 is not checked, and the read value of the master node's RTC is always considered "good." In these cases, the three-step sequence of reading the slave node's TSC, reading the master node's RTC and reading the slave node's TSC a second time may be repeated several (such as about 16) times, as described below.

As noted, the time at which the master node's RTC is read is uncertain, but it is known to be between the two times 1006 and 1008 at which the slave node's TSC is read. Thus, the value of the master node's RTC that is received by the slave node falls within a bounded range, as indicated at 1012.

In one embodiment, if the value read from the master node's RTC is not considered good, the above-described process is repeated until a good master node's RTC value is obtained or a predetermined number of attempts are made.

Once a good master node's RTC value is obtained, it is assumed to correspond to the midway 1010 point, and the slave node's TSC is set, as follows. In embodiments where several master node's RTC values are obtained by performing the three-step sequence several times, the RTC value(s) having the smallest uncertainty(ies) may be considered good.

Figure 11:
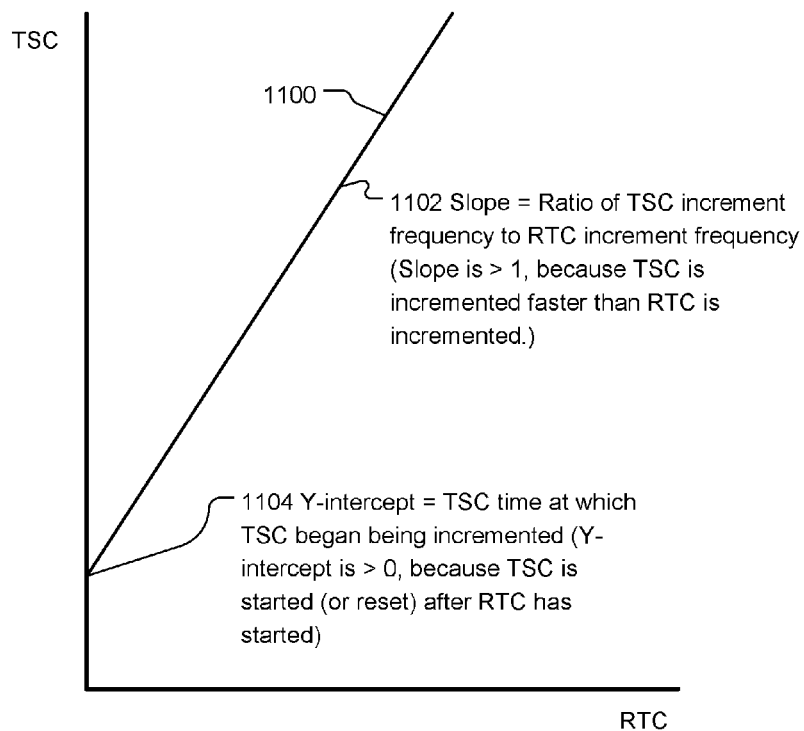
FIG. 11 is a graph depicting a hypothetical exemplary mathematical relationship between values of a time stamp counter (TSC) register and a real-time clock (RTC) register, which is used in part of the process of FIG. 9.

As indicated at 912 (FIG. 9), the slave node estimates the master node's TSC value from the obtained master node's RTC value. The slave node fetches the information the master node stored about its RTC and its TSC, i.e., the ratio of the rates at which the master node's RTC and TSC advance and any offset that represents the time at which the master node's TSC was set. Because the master node's RTC and TSC advance monotonically and at constant rates, a linear relationship exists between the contents of the master node's TSC and the contents of its RTC. A hypothetical example of this relationship is depicted by a line 1100 in a graph in FIG. 11. Slope 1102 of the line 1100 equals the ratio of the rates at which the master node's RTC and TSC advance. Y-intercept 1104 of the line 1100 represents a time at which the master node's TSC started incrementing or was reset to zero.

Figure 10:
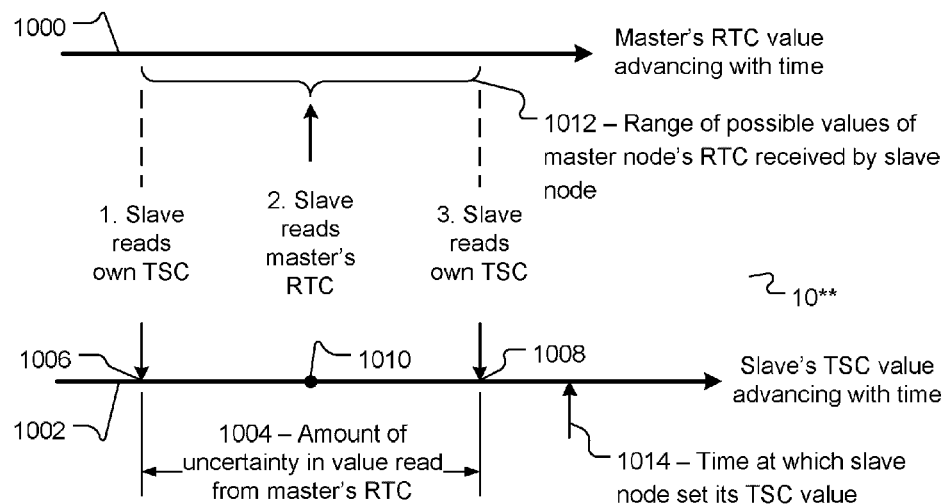
FIG. 10 is a diagram schematically illustrating a sequence of operations performed as part of the process of FIG. 9.

Recall that the objective of the synchronization process is to set the slave node's TSC equal to the master node's TSC. The slave node uses the relationship described with reference to FIG. 11 to estimate what the master node's TSC contained at the time the master node's RTC value was sent to the slave node. As indicated at 914 (FIG. 9), the slave node associates this master node TSC value with the midpoint 1010 (FIG. 10). The slave node calculates a difference between the current slave node TSC value 1014 and the midpoint 1010 value. This difference is added to the master node's TSC value associated with the midpoint 1010 and, as indicated at 916 (FIG. 9), the sum is stored in the slave node's TSC. The slave node's TSC is now synchronized with the master node's TSC, within limits of error of this process.

Figure 12:
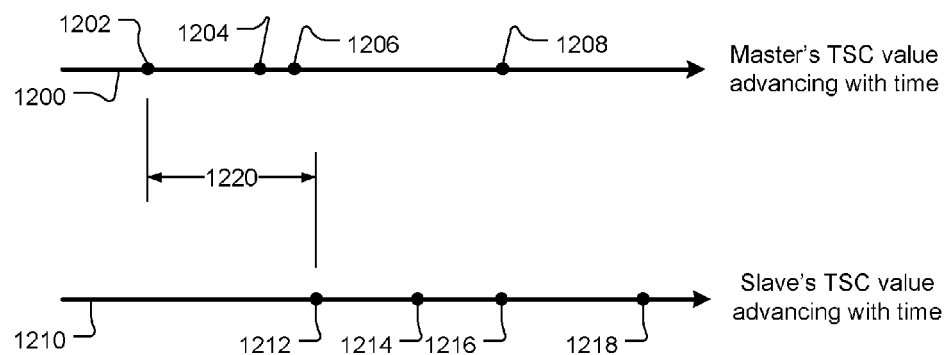
FIG. 12 is a schematic diagram illustrating two time lines used in part of the process of FIG. 9.

In another embodiment, the three-step sequence of reading the slave node's TSC, the master node's RTC and the slave node's TSC a second time is performed several (such as about 16) times as indicated by dashed arrow 917 (FIG. 9) and the first four results are discarded, or until a predetermined accuracy is achieved, and then the slave node's TSC is set. Repeating the sequence several times obtains several master node RTC values and corresponding slave node TSC midpoint values. The slave node stores these value pairs and mathematically constructs timelines using these values. The arrow 1000 in FIG. 10 can be thought of as a time line representing advance of the master node's RTC. A similar arrow 1200 in FIG. 12 represents advance of the master node's TSC, and points 1202, 1204, 1206 and 1208 represent hypothetical exemplary master node TSC values calculated from respective obtained master node RTC values. Four master node TSC values are shown for simplicity; however, any number of TSC values may be used.

Figure 13:
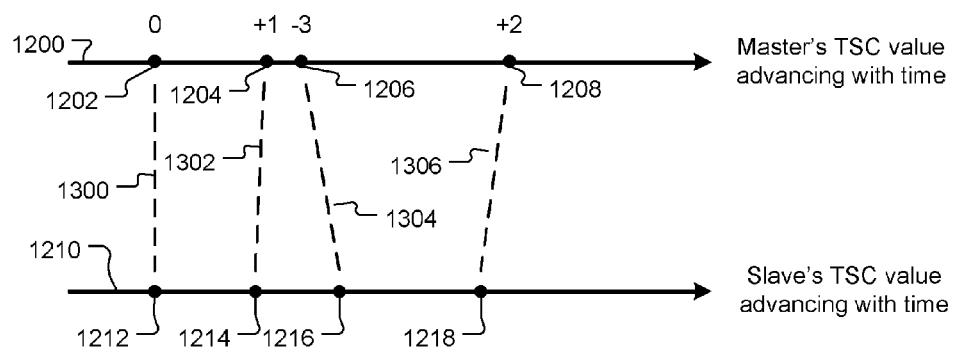
FIG. 13 is a schematic diagram of the time lines of FIG. 12 after shifting one of the timelines.

Similarly, arrow 1210 can be thought of as a time line representing advance of the slave node's TSC, and points 1212, 1214, 1216 and 1218 represent the calculated midpoint slave TSC values associated with the master node TSC values 1202, 1204, 1206 and 1208. Recall that the slave node's TSC began advancing from an arbitrary value, thus the two time lines 1200 and 1210 are offset from each other but, because all processors are fed with same-frequency processor clock signals, the master node's TSC and the slave node's TSC advance at identical rates. The slave node shifts the slave node TSC value timeline 1210, so two corresponding points, such as points 1212 and 1202, on the two timelines 1200 and 1210 are equal, as indicated by a vertical dashed line 1300 shown in FIG. 13. Effectively, an offset between the two timelines 1200 (FIG. 12) and 1210 is calculated, based on an offset 1220 between the two points 1202 and 1212, and the slave node TSC value timeline 1210 is shifted by an amount equal to the offset 1220.

Ideally, each pair of points 1214/1204, 1216/1206 and 1218/1208 should also be equal. However, due to variable latency times in reading the master node's RTC and other variations, this is not likely to be the case, as indicated by non-vertical lines 1302, 1304 and 1306. An amount by which each point 1202, 1204, 1206 and 1208 on the master node TSC time line 1200 differs from its respective counterpart on the slave node TSC time line 1210 is indicated by a number ("delta") above each point 1202-1208. The slave node shifts the slave node's TSC time line 1210 left or right an additional amount that results in the sum of the deltas being as close to zero as possible. Optionally, before shifting the timeline 1210, outlier points are discarded. Once the slave node's TSC timeline 1210 has been appropriately shifted to best match the master node's TSC timeline 1200, the slave node sets its TSC, based on the slave node's TSC timeline 1210.

Optionally or alternatively, an average of the (for example) 16 TSC offsets may be used to set the slave node's TSC.

Returning to FIG. 9, the number of times the loop 917 is executed may be determined by variability of the deltas or by their average absolute value. For example, after a predetermined number of loop 917 executions, if the deltas vary by more than a predetermined value, such as about 20 TSC units, the loop 917 may be executed additional times.

At 918, the slave BIOS generates an interrupt to the master node to indicate the slave has completed setting its TSCs. If another slave node that needs to set its TSCs remains, at 904 control again passes to 906. However, after all the slave nodes have set their TSCs, control passes to 920, where the master node's RTC is enabled for synchronization with other nodes' RTCs.

The master node spreads out the setting of the slave nodes' TSCs, so as to minimize interference between slave nodes querying the master nodes RTC, thereby minimizing the propagation time involved in each slave's reading of the master's RTC. Because each slave node calculates its own value for its TSC based on the RTC values it reads from the master node, there is no need to rush the process.

At 922, once all the slave nodes have set their respective TSCs, the BIOS on the master node starts (boots) the operating system.

Although the process is described as using the master node's RTC, another monotonically increasing register that is accessible by the slaves may be used instead.

Figure 14:
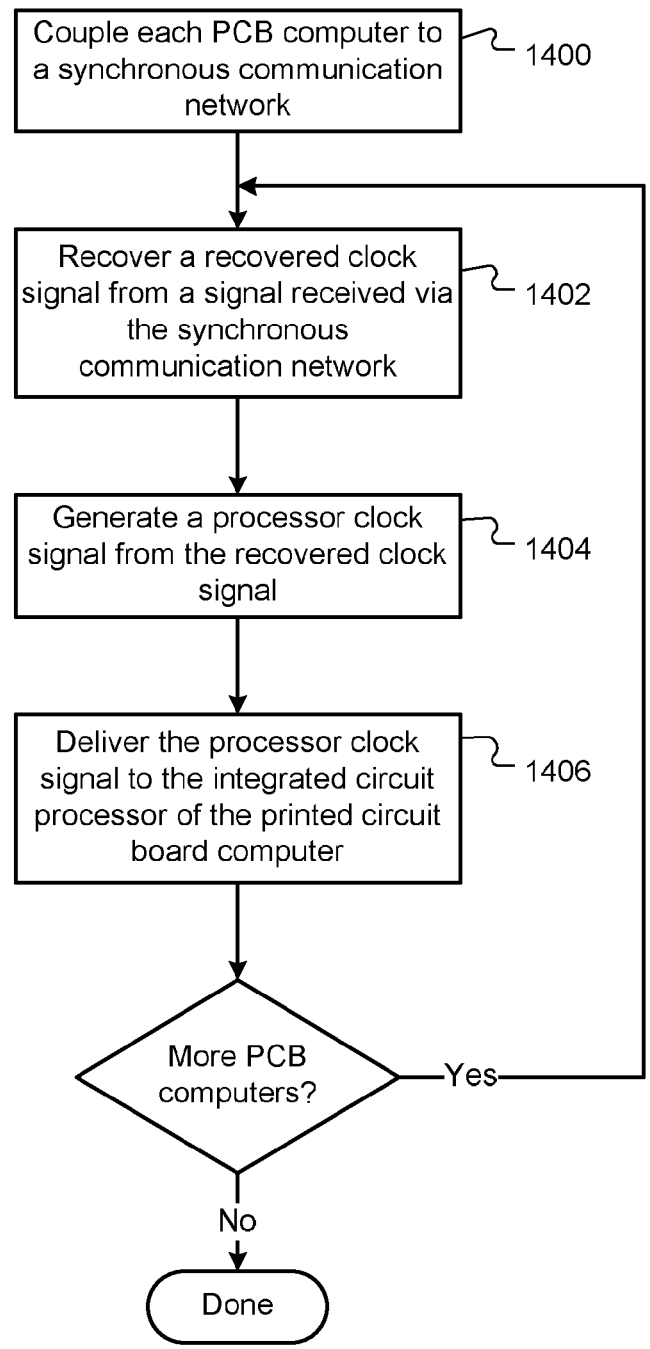
FIG. 14 is a flowchart of a process for clocking a plurality of integrated circuit processors at a common frequency, according to an embodiment of the present invention.

A method for clocking a plurality of integrated circuit processors at a common frequency is schematically illustrated in a flowchart in FIG. 14. Each processor of the plurality of processors is on a respective printed circuit board computer. Each printed circuit board computer is a member of a plurality of printed circuit board computers. At 1400, the plurality of printed circuit board computers is coupled to a synchronous communication network, such as a synchronous Ethernet network. All the printed circuit board computers may be coupled to the same synchronous communication network. For each printed circuit board computer of the plurality of printed circuit board computers, at 1402, a recovered clock signal is recovered from a signal received via the synchronous communication network. At 1404, a processor clock signal is generated from the recovered clock signal. At 1406, the processor clock signal is delivered to the integrated circuit processor of the printed circuit board computer. The processor executes instructions at a rate determined by a frequency of the processor clock signal. Thus, the processor clock signal delivered to the integrated circuit processor is based on a signal generated external to the printed circuit board computer.

Figure 15:
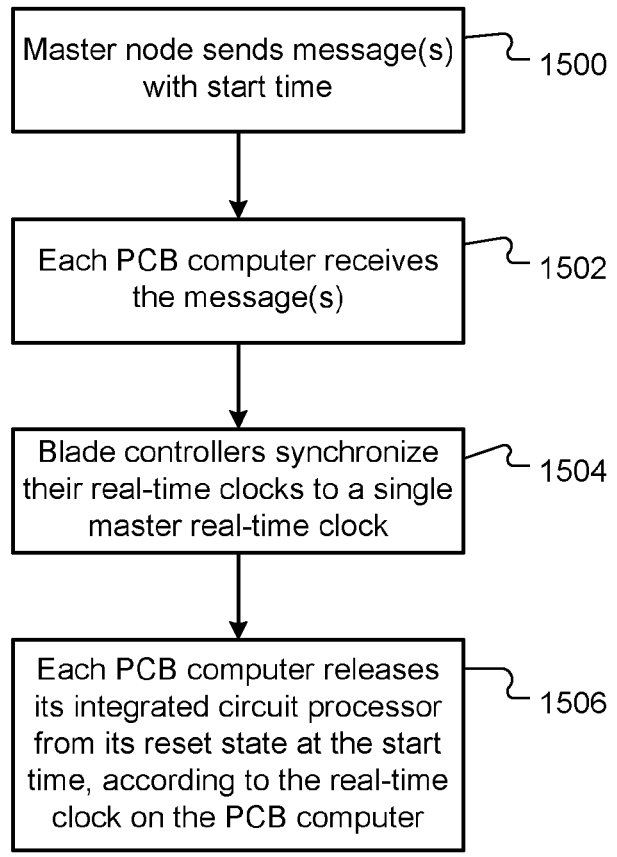
FIG. 15 is a flowchart of a process for releasing all processors of a partition (or another group of nodes) from their respective reset states at the same time, according to an embodiment of the present invention.

Alternatively, rather than setting each node's TSC by having each slave node read the master node's RTC or some other globally accessible monotonically increasing register, all the processors of the nodes of a partition (or another group of nodes) can be released from their reset states at the same time, as illustrated schematically in a flow chart in FIG. 15. Because the TSC of a processor begins with a value of zero after the processor is reset, and all the TSCs increment at the same frequency, all the TSCs will have identical values (within limits, such as due to differences in individual node clock signal propagation times, such as due to temperature differences from node to node).

In this embodiment, at 1500, a master node, which may be for example the chassis controller 260 (FIG. 2) or the system management node 220, sends a message to each blade controller 310 (FIG. 3) in the slave nodes. The message includes a time at which the blade controllers 310 are to release the processors 320 and 322 from their reset states. At 1502, the printed circuit board computers receive the message. At 1504, the blade controllers 310 cause their respective RTCs to be synchronized, such as by use of the Precision Time Protocol (PTP) (also known as the IEEE 1588 Standard for a Precision Clock Synchronization Protocol for Networked Measurement and Control Systems). At the appointed time, as indicated by each slave node's RTC, at 1506, the blade controllers 310 (via the ASICs 340) release the processors from their reset states.

HPC systems constructed as "blade" systems have been described. The term "blade" refers to a packaging format, in which a plurality of printed circuit boards ("blades") are disconnectably connected to a backplane, typically via a socket, in a rack cabinet. However, packaging format is irrelevant to the present invention. Computers and compute "nodes" can be implemented as blades or on other types of circuit boards, regardless of whether the circuit boards are disconnectably connected to a backplane or whether they are mounted in a rack cabinet.

While the invention is described through the above-described exemplary embodiments, modifications to, and variations of, the illustrated embodiments may be made without departing from the inventive concepts disclosed herein. Furthermore, disclosed aspects, or portions of these aspects, may be combined in ways not listed above and/or not explicitly claimed. Accordingly, the invention should not be viewed as being limited to the disclosed embodiments.

Although aspects of embodiments, such as the procedure for setting the values of the TSC at startup, may have been described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible, non-transitory, non-writable storage media (e.g., read-only memory devices within a computer, such as ROM, or devices readable by a computer I/O attachment, such as CD-ROM or DVD disks), information alterably stored on tangible, non-transitory, writable storage media (e.g., floppy disks, removable flash memory and hard drives) or information conveyed to a computer through a communication medium, including wired or wireless computer networks.

Although the above discussion discloses various exemplary embodiments of the invention, it should be apparent that those skilled in the art can make various modifications that will achieve some of the advantages of the invention without departing from the true scope of the invention.

What is claimed is:

1. A computer comprising:
a first printed circuit board comprising:
a memory;
an integrated circuit processor:
coupled to the memory;
comprising a processor clock signal input port configured to receive a first processor clock signal; and
configured to execute instructions, fetched from the memory, at a speed determined by the first processor clock signal;
a first network port configured to be connectable to a first synchronous communication network;
a first physical layer interface coupled to the first network port and configured to recover a first recovered clock signal from a signal received via the first synchronous communication network; and
a clock signal distribution circuit configured to:
receive the first recovered clock signal;
generate the first processor clock signal therefrom; and
deliver the first processor clock signal to the processor clock signal input port;
whereby the first processor clock signal delivered to the clock signal input port of the integrated circuit processor is based on a signal generated external to the first printed circuit board.

2. A computer as recited in claim 1, wherein the clock signal distribution circuit comprises a clock frequency multiplier configured to generate the first processor clock signal by multiplying frequency of the first recovered clock signal by a predetermined value.

3. A computer as recited in claim 2, wherein:
the memory comprises a memory clock signal input port configured to receive a memory clock signal; and
the clock signal distribution circuit is configured to:
generate the memory clock signal from the first recovered clock signal; and deliver the memory clock signal to the memory clock signal input port;
whereby the memory clock signal delivered to the clock signal input port of the memory is based on a signal generated external to the first printed circuit board.

4. A computer as recited in claim 1, wherein the clock signal distribution circuit comprises a jitter attenuator.

5. A computer as recited in claim 1, wherein the integrated circuit processor comprises a register that is incremented per cycle of the integrated circuit processor.

6. A computer as recited in claim 1, further comprising:
a second printed circuit board, different than the first printed circuit board, comprising:
  a second memory;
  a second integrated circuit processor:
    coupled to the second memory;
    comprising a second processor clock signal input port configured to receive a second processor clock signal; and
    configured to execute instructions, fetched from the second memory, at a speed determined by the second processor clock signal;
  a second network port configured to couple to the first synchronous communication network;
  a second physical layer interface coupled to the second network port and configured to recover a second recovered clock signal from a signal received via the first synchronous communication network; and
  a second clock signal distribution circuit configured to:
    receive the second recovered clock signal;
    generate the second processor clock signal therefrom; and
    deliver the second processor clock signal to the second processor clock signal input port.

7. A computer as recited in claim 6, further comprising a housing, wherein the first printed circuit board, the second printed circuit board and at least a portion of the first synchronous communication network are disposed within the housing.

8. A computer as recited in claim 1, further comprising:
a first plurality of distinct printed circuit boards, each distinct printed circuit board of the first plurality of distinct printed circuit boards comprising a respective:
  memory;
  integrated circuit processor:
    coupled to the memory;
    comprising a processor clock signal input port configured to receive a processor clock signal; and
    configured to execute instructions, fetched from the memory, at a speed determined by the processor clock signal;
  network port configured to couple to the first synchronous communication network;
  physical layer interface coupled to the network port and configured to recover a first recovered clock signal from a signal received via the first synchronous communication network; and
  clock signal distribution circuit configured to:
    receive the first recovered clock signal;
    generate the processor clock signal therefrom; and
    deliver the processor clock signal to the processor clock signal input port.

9. A computer as recited in claim 8, wherein each integrated circuit processor comprises a respective register that is incremented per cycle of the respective integrated circuit processor.

10. A computer as recited in claim 8, further comprising a controller comprising:
a network clock signal generator configured to generate a network clock signal; and
a network switch coupled to the first synchronous communication network and configured to communicate, via the first synchronous communication network, with the physical layer interface in the first printed circuit board and with the physical layer interface in each distinct printed circuit board of the first plurality of distinct printed circuit boards, according to the network clock signal;
whereby the first processor clock signal delivered to the clock signal input port of the integrated circuit processor and the processor clock signal delivered to the clock signal input port of the integrated circuit processor of each distinct printed circuit board of the first plurality of distinct printed circuit boards are each based on the network clock signal.

11. A computer as recited in claim 10, wherein the controller further comprises:
a second network port configured to couple to a second synchronous network, different than the first synchronous network; and
a second physical layer interface coupled to the second network port and configured to recover a second recovered clock signal from the second synchronous network; wherein:
the network clock signal generator is configured to generate the network clock signal from the second recovered clock signal.

12. A computer as recited in claim 11, further comprising:
a third synchronous network;
a second plurality of distinct printed circuit boards, each distinct printed circuit board of the second plurality of distinct printed circuit boards comprising a respective:
  memory;
  integrated circuit processor:
    coupled to the memory;
    comprising a processor clock signal input port configured to receive a processor clock signal; and
    configured to execute instructions, fetched from the memory, at a speed determined by the processor clock signal;
  network port configured to couple to the third synchronous network;
  physical layer interface coupled to the network port and configured to recover a third recovered clock signal from the third synchronous network; and
  clock signal distribution circuit configured to:
    receive the third recovered clock signal;
    generate the processor clock signal from the third recovered clock signal; and
    deliver the processor clock signal to the processor clock signal input port; and
a second controller comprising:
  a third network port configured to couple to the second synchronous network;
  a third physical layer interface coupled to the third network port and configured to recover a third recovered clock signal from the second synchronous network;
  a second network clock signal generator configured to generate a second network clock signal from the third recovered clock signal; and
  a second network switch coupled to the third synchronous network and configured to communicate, via the third synchronous network, with the physical layer interface in each printed circuit board of the second plurality of distinct printed circuit boards according to the second network clock signal.

13. A computer-implemented method for setting values in a plurality of registers, each register of the plurality of registers being associated with a respective printed circuit board and being part of an integrated circuit processor of the respective printed circuit board and being configured to be automatically periodically incremented by the integrated circuit processor, the method comprising performing by a processor operations of:
(a) selecting a master printed circuit board;
(b) for each printed circuit board ("slave printed circuit board") of a plurality of printed circuit boards, performing operations (c) to (g):
(c) by a BIOS of the master printed circuit board, invoking a BIOS of the slave printed circuit board;
(d) by the BIOS of the slave printed circuit board, in response to the invocation, reading a value of a first register of the master printed circuit board, the first register of the master circuit board being configured to be periodically automatically incremented;
(e) by the BIOS of the slave printed circuit board, calculating a value for the register associated with the slave printed circuit board, based at least in part on the value of the first register of the master printed circuit board;
(f) by the BIOS of the slave printed circuit board, storing the calculated value for the register in the register; and
(g) if another slave printed circuit board of the plurality of printed circuit boards remains to be processed, by the BIOS of the master printed circuit board, selecting a different slave printed circuit board.

14. A method as recited in claim 13, wherein reading the value of the first register of the master printed circuit board comprises:
initiating reading a first value of the register associated with the slave printed circuit board;
after initiating the reading of the first value of the register, initiating reading a value of the first register of the master printed circuit board;
after initiating the reading the first register of the master printed circuit board, initiating reading a second value of the register associated with the slave printed circuit board; and
associating the value of the first register of the master printed circuit board with a value between the first value of the register associated with the slave printed circuit board and the second value of the register associated with the slave printed circuit board.

15. A method as recited in claim 14, wherein calculating the value for the register associated with the slave printed circuit board comprises:
estimating a value of a second register of the master printed circuit board, based at least in part on the value of the first register of the master printed circuit board, thereby yielding an estimated value of the second register, wherein:
the second register on the master printed circuit board is configured to be automatically periodically incremented; and
the estimating is based at least in part on a ratio of a rate at which the first register on the master printed circuit board is incremented to a rate at which the second register on the master printed circuit board is incremented; wherein calculating the value for the register associated with the slave printed circuit board comprises calculating the value for the register associated with the slave printed circuit board based at least in part on the estimated value of the second register.

16. A method as recited in claim 15, wherein calculating the value for the register associated with the slave printed circuit board comprises calculating an offset between a value of the register associated with the slave printed circuit board and a value of the second register of the master printed circuit board.

17. A method as recited in claim 16, further comprising repeating (d) and (e) a number of times.

18. A method as recited in claim 16, further comprising repeating (d) and (e) and operations recited in claims 14, 15 and 16 a number of times.

19. A method for clocking a plurality of integrated circuit processors at a common frequency, each processor of the plurality of processors being on a respective printed circuit board computer, each printed circuit board computer being a member of a plurality of printed circuit board computers, the method comprising:
coupling the plurality of printed circuit board computers to a synchronous communication network; and
for each printed circuit board computer of the plurality of printed circuit board computers:
recovering a recovered clock signal from a signal received via the synchronous communication network;
generating a processor clock signal from the recovered clock signal; and
delivering the processor clock signal to the integrated circuit processor of the printed circuit board computer, such that the processor executes instructions at a rate determined by a frequency of the processor clock signal;
whereby the processor clock signal delivered to the integrated circuit processor is based on a signal generated external to the printed circuit board computer.

20. A method for setting a value in each register of a plurality of registers, each register being associated with a respective printed circuit board computer and being part of an integrated circuit processor of the respective printed circuit board computer and being configured to be automatically periodically incremented by the integrated circuit processor, each printed circuit board computer having a respective real-time clock, distinct from the register, each real-time clock being a member of a plurality of real-time clocks, the method comprising:
sending, from a master node, at least one message containing a start time, each message of the at least one message containing an identical start time;
receiving, by each printed circuit board computer, at least one of the at least one message;
synchronizing the plurality of real-time clocks with a single master real-time clock;
after synchronizing the plurality of real-time clocks, for each printed circuit board computer, releasing the respective integrated circuit processor from a reset state at the start time, according to the respective real-time clock, thereby causing each register of the plurality of registers to initially store a common value and thereafter to be periodic incremented.

21. A method according to claim 20, wherein each printed circuit computer is coupled to a synchronous communication network, the method further comprising, by each printed circuit board computer:

recovering a recovered clock signal from a signal received via the synchronous communication network;
generating a processor clock signal from the recovered clock signal; and
delivering the processor clock signal to the integrated circuit processor of the printed circuit board computer, such that the register is incremented at a rate determined by a frequency of the processor clock signal.

* * * * *